US011235461B2

(12) United States Patent
Hayashi

(10) Patent No.: US 11,235,461 B2
(45) Date of Patent: Feb. 1, 2022

(54) CONTROLLER AND MACHINE LEARNING DEVICE

(71) Applicant: Fanuc Corporation, Yamanashi (JP)

(72) Inventor: Kouichirou Hayashi, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 292 days.

(21) Appl. No.: 16/354,381

(22) Filed: Mar. 15, 2019

(65) Prior Publication Data
US 2019/0291271 A1    Sep. 26, 2019

(30) Foreign Application Priority Data
Mar. 26, 2018    (JP) .............................. JP2018-058685

(51) Int. Cl.
B25J 9/16    (2006.01)

(52) U.S. Cl.
CPC .............. B25J 9/163 (2013.01); B25J 9/161 (2013.01); B25J 9/1653 (2013.01); B25J 9/1664 (2013.01)

(58) Field of Classification Search
CPC ........ B25J 9/1664; B25J 9/1653; B25J 9/161; B25J 9/163; B25J 9/1641; B25J 9/1694; B25J 9/103; B25J 9/1607; B25J 9/1638
See application file for complete search history.

(56) References Cited

U.S. PATENT DOCUMENTS

2006/0082340 A1    4/2006  Watanabe et al.
2015/0148956 A1*   5/2015  Negishi .................... B25J 9/163
                                                                700/253
2016/0243704 A1*   8/2016  Vakanski .............. B25J 9/1697
2017/0341231 A1*   11/2017 Tan ......................... B25J 9/162
2018/0225113 A1*   8/2018  Hasegawa .............. B25J 9/161

FOREIGN PATENT DOCUMENTS

| JP | 0588721 A | 4/1993 |
| JP | 2004-322224 A | 11/2004 |
| JP | 2006-110702 A | 4/2006 |
| JP | 2017-127964 A | 7/2017 |

OTHER PUBLICATIONS

Notice of Reasons for Refusal for Japanese Application No. 2018-058685, dated Apr. 14, 2020 with translation, 7 pages.

* cited by examiner

Primary Examiner — Jeff A Burke
Assistant Examiner — Arslan Azhar
(74) Attorney, Agent, or Firm — RatnerPrestia

(57) ABSTRACT

A machine learning device is provided in a versatile controller capable of inferring command data to be issued to each axis of a robot. The device includes an axis angle conversion unit calculating, from the trajectory data, an amount of change of an axis angle of an axis of the robot, a state observation unit observing axis angle data relating to the amount of change of the axis angle of the axis of the robot as a state variable representing a current state of an environment, a label data acquisition unit acquiring axis angle command data relating to command data for the axis of the robot as label data, and a learning unit learning the amount of change of the axis angle of the axis of the robot and the command data for the axis in association with each other by using the state variable and the label data.

9 Claims, 6 Drawing Sheets

CONTROLLER AND MACHINE LEARNING DEVICE

RELATED APPLICATION

The present application claims priority to Japanese Application Number 2018-058685 filed Mar. 26, 2018, the disclosure of which is hereby incorporated by reference herein in its entirety.

BACKGROUND OF THE INVENTION

1. Field of the Invention

The present invention relates to a controller and a machine learning device and, in particular, to a controller and a machine learning device that generate high-accuracy trajectory command data.

2. Description of the Related Art

When laser-beam machining, sealing, arc welding or the like is performed by using a robot, trajectory accuracy of a robot tool center point (TCP) is important. When the robot is controlled, a motor that drives each joint of the robot is controlled in such a way that the robot TCP follows an assumed target trajectory. However, the robot TCP can deviate from a target trajectory assumed in advance because of factors such as an insufficient stiffness of a speed reducer provided at a joint of the robot or a robot arm itself and backlash of each joint axis.

Note that existing techniques that improve the trajectory accuracy of a robot TCP include techniques disclosed in Japanese Patent Laid-Open No. 2006-110702, Japanese Patent Laid-Open No. 2004-322224, and Japanese Patent Laid-Open No. 2017-127964, in which learning control is repeated based on the trajectory of a robot TCP of a robot in operation that has been identified by a sensor, simulation and the like, thereby reproducing a target trajectory.

As illustrated by the existing techniques, what obtained from a sensor attached to a robot is a physical quantity such as acceleration, angular speed, or sense of force. To obtain the trajectory of a robot TCP from a measured physical quantity, calculation such as integration is required. In addition, because a sensor value can contain noise, the accuracy of a position calculated can be low and the effect of improvement of trajectory accuracy by repetitive learning also can be small. Further, while there are instruments that directly measure the position of an end position of a robot, such as laser trackers, the use of such an instrument for recording the trajectory of a robot TCP has a problem that this is very troublesome because the measurement instrument needs to be installed every time a change is made to an operation of the robot and learning is performed.

SUMMARY OF THE INVENTION

Therefore, an object of the present invention is to provide a controller and a machine learning device that are versatile and capable of inferring command data to be issued to each axis of a robot on the basis of a target trajectory of the robot.

A controller according to the present invention improves the trajectory accuracy of a robot TCP by using a measurement instrument that directly measures an operation trajectory of a robot as position data, and command data issued to the robot. A system that, when ideal trajectory data is input, outputs command data for reproducing the trajectory is built by performing machine learning using data concerning an operation trajectory of a robot TCP measured by a position measurement instrument (hereinafter referred to as measured trajectory data) and command data used for controlling the robot as a learning data set.

One aspect of the present invention is a controller that infers command data to be issued to an axis of a robot on the basis of trajectory data of an end position of an arm of the robot, the controller including a machine learning device learning inference of command data that corresponds to the trajectory data and is to be issued to the axis of the robot, including: an axis angle conversion unit calculating, from the trajectory data, an amount of change of the axis angle of the axis of the robot; a state observation unit observing axis angle data relating to the amount of change of the axis angle of the axis of the robot calculated by the axis angle conversion unit as a state variable representing a current state of an environment; a label data acquisition unit acquiring axis angle command data relating to the command data for the axis of the robot as label data; and a learning unit learning the amount of change of the axis angle of the axis of the robot and command data for the axis of the robot in association with each other by using the state variable and the label data.

Another aspect of the present invention is a controller that infers command data to be issued to an axis of a robot on the basis of trajectory data of an end position of an arm of the robot, the controller including a machine learning device having learned inference of command data that corresponds to the trajectory data and is to be issued to an axis of the robot, including: an axis angle conversion unit calculating, from the trajectory data, an amount of change of an axis angle of the axis of the robot; a state observation unit observing axis angle data relating to the amount of change of the axis angle of the axis of the robot calculated by the axis angle conversion unit as a state variable representing a current state of an environment; a learning unit having learned the amount of change of the axis angle of the axis of the robot and command data for the axis of the robot in association with each other; and an inference result output unit inferring and outputting command data for the axis of the robot on the basis of the state variable observed by the state observation unit and a result of learning by the learning unit.

Another aspect of the present invention is a machine learning device that learns command data to be issued to an axis of a robot, the command data corresponding to trajectory data of an end position of an arm of the robot, the machine learning device including: an axis angle conversion unit calculating, from the trajectory data, an amount of change of an axis angle of the axis of the robot; a state observation unit observing axis angle data relating to the amount of change of the axis angle of the axis of the robot calculated by the axis angle conversion unit as a state variable representing a current state of an environment; a label data acquisition unit acquiring axis angle command data relating to the command data for the axis of the robot as label data; and a learning unit learning the amount of change of the axis angle of the axis of the robot and command data for the axis of the robot in association with each other by using the state variable and the label data.

Another aspect of the present invention is a machine learning device that has learned inference of command data to be issued to an axis of a robot, the command data corresponding to trajectory data of an end position of an arm of the robot, the machine learning device including: an axis angle conversion unit calculating, from the trajectory data, an amount of change of the axis angle of the axis of the robot; a state observation unit observing axis angle data relating to the amount of change of the axis angle of the axis of the robot calculated by the axis angle conversion unit as a state variable representing a current state of an environment; and a learning unit having learned the amount of change of the axis angle of the axis of the robot and command data for the axis of the robot in association with each other; and an inference result output unit inferring and outputting command data for the axis of the robot on the basis of the state variable observed by the state observation unit and a result of learning by the learning unit.

The present invention enables command data for a robot to be inferred in a versatile manner by teaching various movements of the robot because command data to be issued to each axis of the robot is allowed to be inferred based on a target trajectory of the robot.

BRIEF DESCRIPTION OF THE DRAWINGS

The object and features described above and other objects and features of the present invention will be apparent from the following description of example embodiments with reference to the accompanying drawings, in which.

DETAILED DESCRIPTION OF THE PREFERRED EMBODIMENTS

Embodiments of the present invention will be described with reference to drawings.

Figure 1:
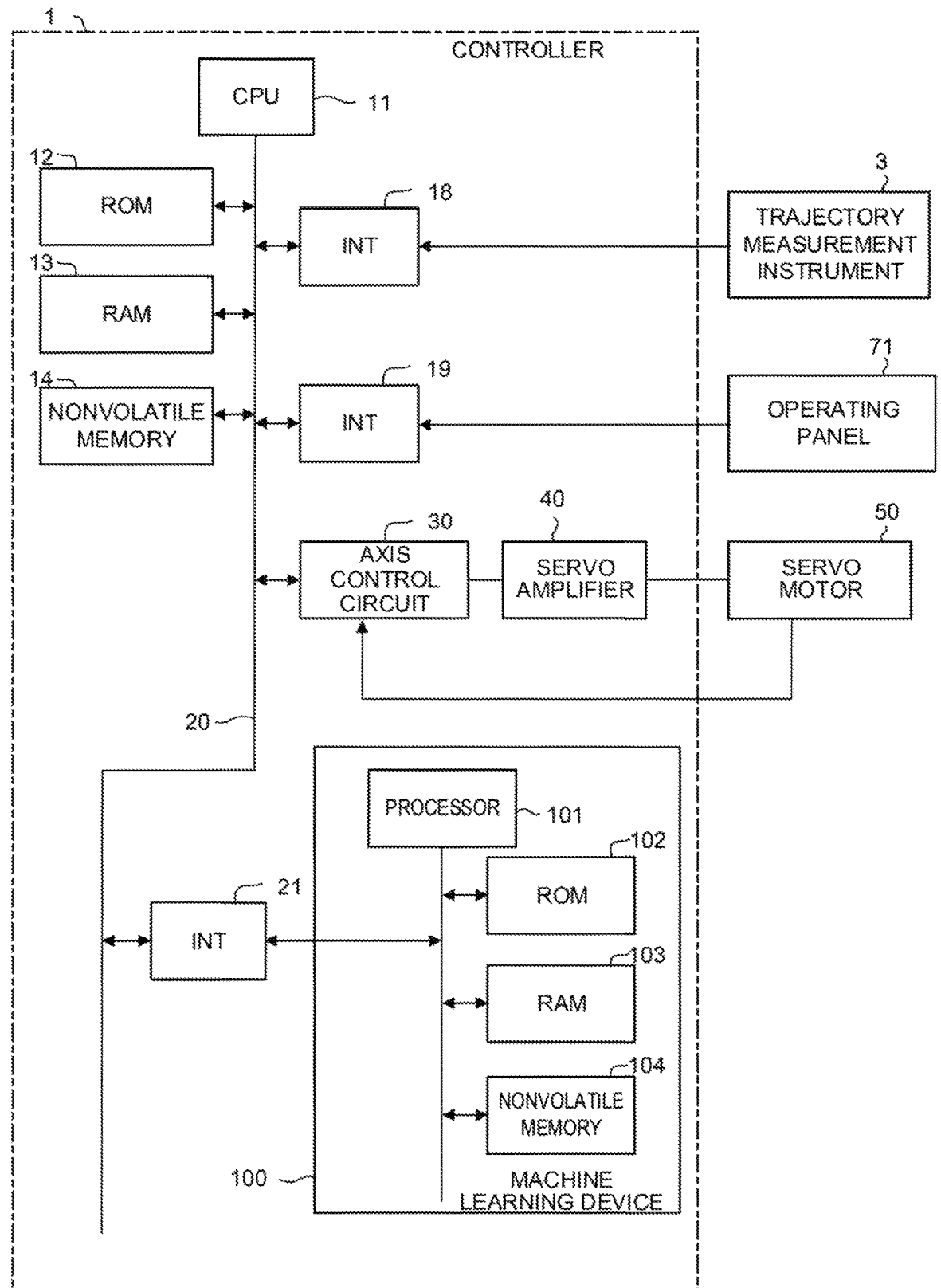
FIG. 1 shows a schematic hardware configuration diagram of a controller according to one embodiment.

FIG. 1 is a schematic hardware configuration diagram illustrating a major part of a controller according to a first embodiment. A controller 1 can be implemented as a controller that controls a robot, for example. The controller 1 can also be implemented as a computer that is provided in conjunction with a controller that controls a robot, or a computer such as a cell computer, a host computer, or a cloud server that is connected to the controller through a network. FIG. 1 illustrates an example in which the controller 1 is implemented as a controller that controls a manufacturing machine.

A CPU 11 of the controller 1 according to the present embodiment is a processor that generally controls the controller 1. The CPU 11 reads a system program stored in a ROM 12 through a bus 20 and controls the entire controller 1 in accordance with the system program. A RAM 13 stores data such as temporary calculation data and display data, various data input by an operator through an input unit (not shown).

A nonvolatile memory 14 is configured as a memory that maintains a stored state by being backed up using a battery (not shown), for example, when the controller 1 is powered off. The nonvolatile memory 14 stores a control program read through an interface 19, a taught position taught through an operating panel 71, data such as various data acquired from the robot, its peripheral devices and a trajectory measurement instrument 3. The program stored in the nonvolatile memory 14 may be loaded into the RAM 13 when used. Further, various system programs (including a system program for controlling communication with a machine learning device 100) required for operation of controller 1 are written in the ROM 12 beforehand.

The trajectory measurement instrument 3 is a measurement instrument, such as a laser tracker, that directly measures an operation trajectory of a target object as position data and, in the present embodiment, measures position data of an end of an arm of a robot by measuring an object-to-be-measured that is attached at the end of the arm of the robot as a trajectory measurement point during learning by the machine learning device 100. The CPU 11 acquires the position data as trajectory data through an interface 18.

An axis control circuit 30 for controlling an axis of the robot receives a commanded axis move amount from the CPU 11 and outputs an axis command to a servo amplifier 40. In response to this command, the servo amplifier 40 drives a servo motor 50 which moves the axis of the robot. The servo motor 50 for the axis incorporates a position/speed detector and performs feedback control of position/speed by feeding back a position/speed feedback signal from the position/speed detector to the axis control circuit 30.

While only one axis control circuit 30, one servo amplifier 40 and one servo motor 50 are shown in the hardware configuration diagram in FIG. 1, as many of each of these components as the number of axes of a robot to be controlled are provided.

An interface 21 is an interface for interconnecting the controller 1 and the machine learning device 100. The machine learning device 100 includes a processor 101 that controls the entire machine learning device 100, a ROM 102 that stores a system program and the like, a RAM 103 for temporary storage in each process relating to machine learning, and a nonvolatile memory 104 used for storing a learning model and the like. The machine learning device 100 is capable of observing each kind of information that can be acquired in the controller 1 through the interface 21. Further, the controller 1 controls the robot on the basis of a value output from the machine learning device 100.

Figure 2:
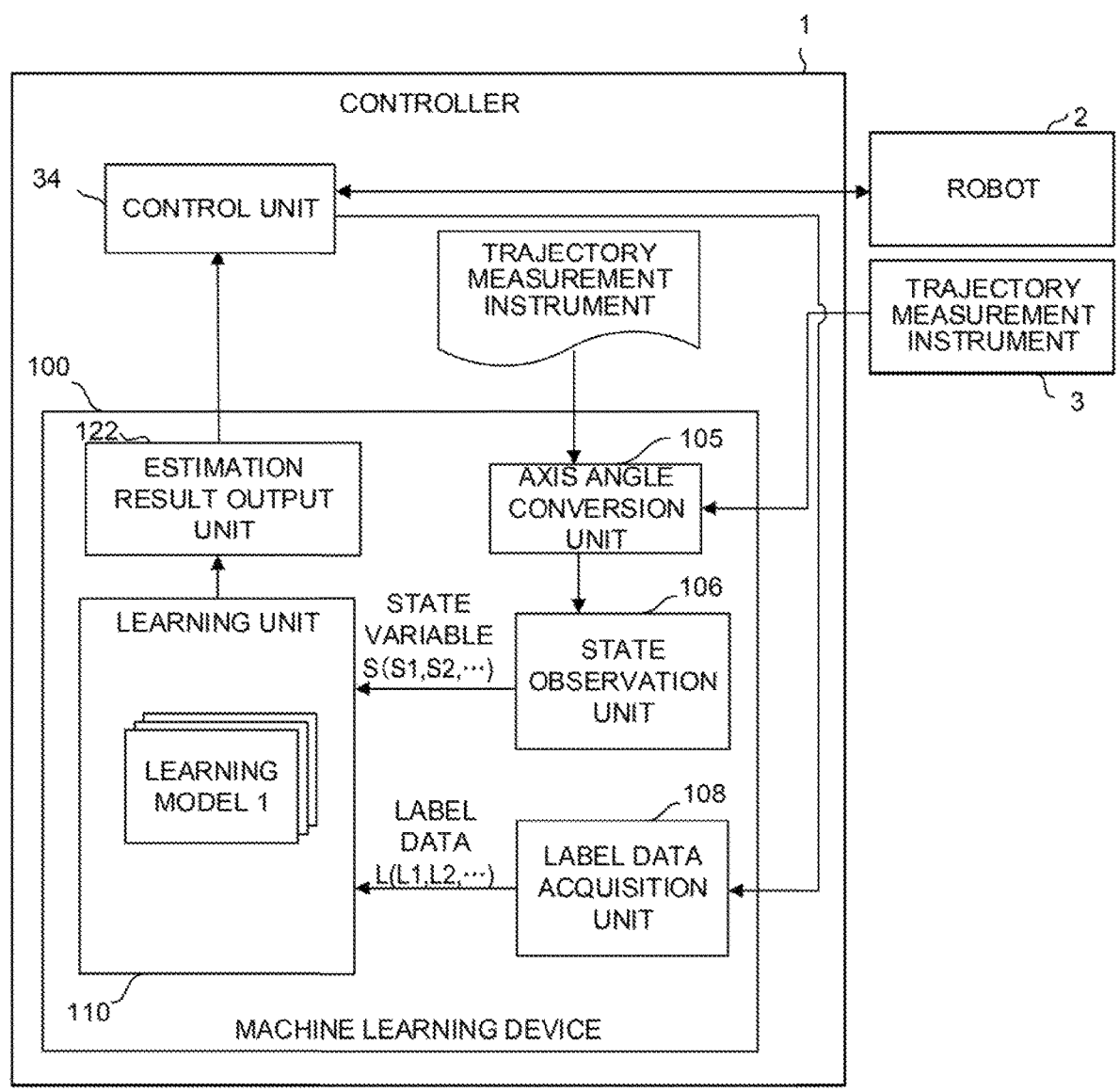
FIG. 2 shows a schematic functional block diagram of a controller according to one embodiment.

FIG. 2 is a schematic functional block diagram of the controller 1 and the machine learning device 100 according to the first embodiment. Functional blocks shown in FIG. 2 are implemented by the CPU 11 of the controller 1 and the processor 101 of the machine learning device 100 shown in FIG. 1 executing their respective system programs to control operation of each unit of the controller 1 and the machine learning device 100.

The controller 1 according to the present embodiment includes a control unit 34 that reads a block of a control program and a taught position stored in the nonvolatile memory 14 and controls a robot 2 and its peripheral devices.

The control unit 34 is a functional means for reading a block of a control program and a taught position stored in the nonvolatile memory 14 (or a block of a control program and a taught position loaded in the RAM 13) to control the robot 2 on the basis of a command according to the block. The control unit 34 includes general functions for controlling each part of the robot 2, such as: when a block of the control program instructs to move each axis (joint) of the robot 2, outputting, in each control interval, command data as an amount of change of an axis angle to a servo motor 50 which drives the axis, and when a block of the control program instructs to operate a peripheral device (not shown), provided in the robot 2, outputting an operation command to the peripheral device.

On the other hand, the machine learning device 100 provided in the controller 1 includes software (such as a learning algorithm) and hardware (such as the processor 101) for teaching by itself inference of each axis angle command data of the robot 2 that corresponds to (an amount of change of the axis angle of each axis converted from) trajectory data of an end of an arm of the robot 2 by so-called machine learning. What the machine learning device 100 provided in the controller 1 teaches by itself is equivalent to a model structure representing correlation between (an amount of change of the axis angle of each axis converted from) trajectory data of the end of the arm of the robot 2 and each axis angle command data of the robot 2.

As shown in the functional blocks in FIG. 2, the machine learning device 100 provided in the controller 1 includes an axis angle conversion unit 105 that obtains an amount of change of the axis angle of each axis of the robot 2 from the position of the end of the arm of the robot 2 which is included in trajectory data acquired by measurement by the trajectory measurement instrument 3, a state observation unit 106 which observes a state variable S representing a current state of an environment that includes axis angle data S1 indicating the axis angle of each axis of the robot 2 converted by the axis angle conversion unit 105, a label data acquisition unit 108 which acquires label data L including axis angle command data L1 indicating an amount of change of an axis angle to be issued to each axis of the robot 2, the learning unit 110 that learns an amount of change of the axis angle of each axis to be issued to the robot 2 in association with an amount of change of the axis angle of the axis converted from trajectory data of the end of the arm of the robot 2 by using the state variable S and the label data L, and an inference result output unit 122 that outputs an amount of change of the axis angle that has been inferred from (an amount of change of the axis angle of each axis converted from) trajectory data of the end of the arm of the robot 2 using a learned model by the learning unit 110 and is to be issued to the axis of the robot 2 as axis angle command data.

The axis angle conversion unit 105 is a functional means for performing conversion to an amount of change of the axis angle of each axis of the robot 2 on the basis of the position of the end of the arm of the robot 2 included in trajectory data acquired by the trajectory measurement instrument 3 measuring the object-to-be-measured attached to the end of the arm of the robot 2. The axis angle conversion unit 105 obtains an axis angle (position) of each axis of the robot 2 on the basis of data such as the position of the end of the arm of the robot 2 and the length of each of the arms making up the robot 2 by using a known method such as inverse kinematics and calculates an amount of change of the axis angle of the axis from the obtained axis angle of the axis.

Figure 3:
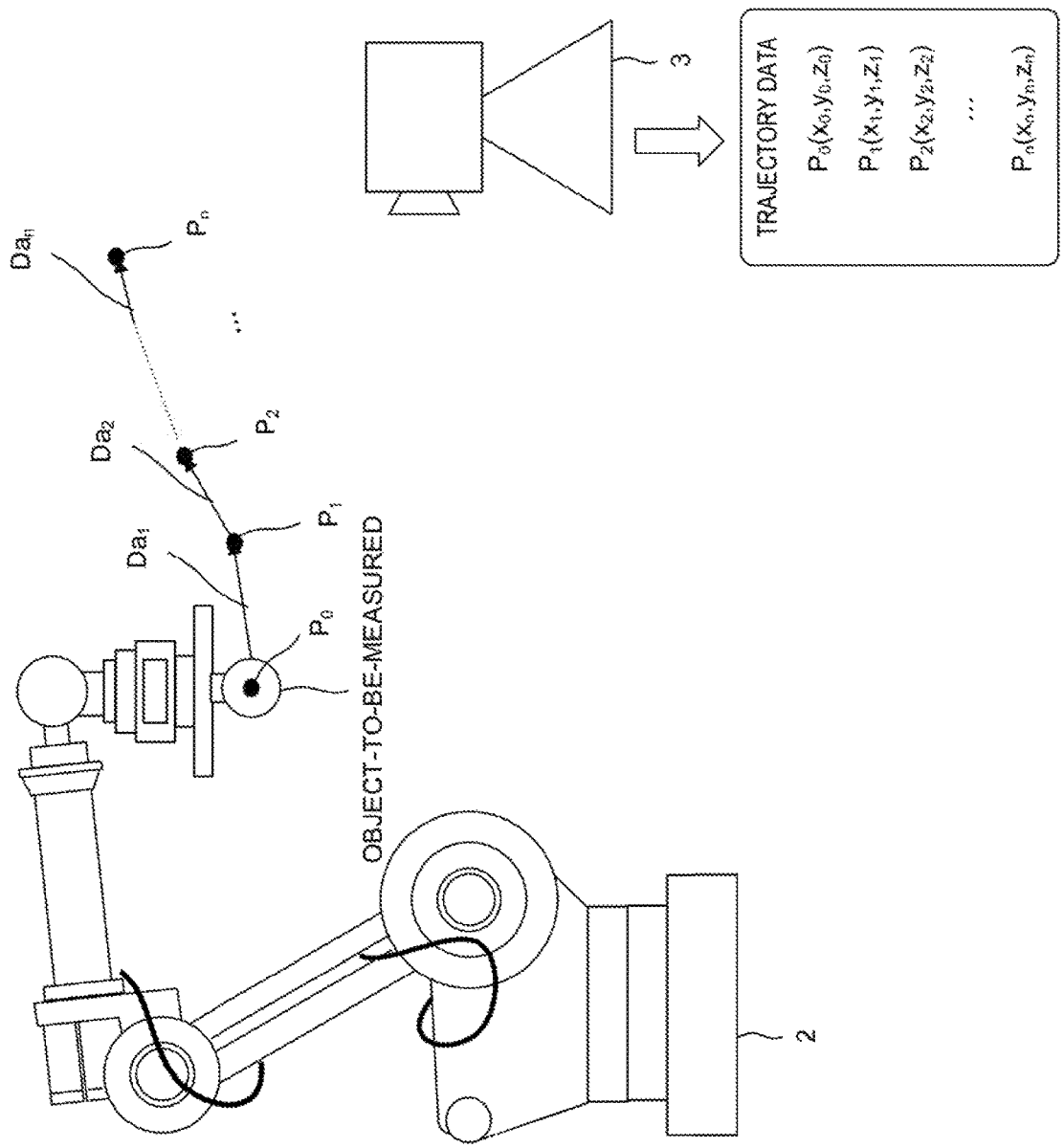
FIG. 3 shows a diagram illustrating an example of trajectory data.

FIG. 3 is a diagram showing an example of trajectory data of the end of the arm of the robot 2. The trajectory data of the end of the arm of the robot 2 can be defined as a series of position data (in a predetermined coordinate system, for example a robot coordinate system) measured by the trajectory measurement instrument 3 measuring the position of the object-to-be-measured attached to the end of the arm of the robot 2 at predetermined intervals. The axis angle conversion unit 105 obtains an amount of change of the axis angle of each axis at predetermined intervals on the basis of each piece of position data of the object-to-be-measured included in trajectory data in each interval. For example, when trajectory data shown in FIG. 3 has been acquired, the axis angle conversion unit 105 obtains an amount of change $Da_1$ of axial speed of each axis when the object-to-be-measured moves from $P_0$ to $P_1$, an amount of change $Da_2$ of axial speed of each axis when the object-to-be-measured moves from $P_1$ to $P_2$, and so on, in sequence.

While trajectory data used by the axis angel conversion unit 105 in obtaining an amount of change of axis angel may be acquired from the trajectory measurement instrument 3 at each move, trajectory data measured by the trajectory measurement instrument 3 may be temporarily stored in a memory such as the nonvolatile memory 14 and may be acquired from the memory in subsequent learning. In this case, a time or the like is preferably stored in association so that correspondence between (each piece of position data included in) trajectory data stored on the memory and command data output from the control unit 34 to the robot 2 (for example, a correspondence between position data $P_1$ and command data $Ca_1$ when command data $C_1$ is output from the control unit 34 to each axis of the robot 2 when the position of the object-to-be-measured is at $P_1$) can be identified.

The state observation unit 106 acquires axis angle data S1 from the axis angle conversion unit 105 as a state variable S during learning by the learning unit 110. Further, the state observation unit 106 acquires axis from the axis angle conversion unit 105 during inference of axis angle command data for each axis of the robot 2 using a result of learning by the learning unit 110.

The label data acquisition unit 108 acquires axis angle command data L1 (Ca: $Ca_1$, $Ca_2$, . . . ) relating to axis angle command data for each axis output from the control unit 34 to the robot 2 as label data L during learning by the learning unit 110. As the axis angle command data L1, axis angle command data for each axis output from the control unit 34 to the robot 2, for example, may be directly acquired, or axis angle command data for each axis output from the control unit 34 to the robot 2 may be temporarily stored in a memory such as the nonvolatile memory 14 and may be acquired from the memory during subsequent learning. In the latter case, for example, a time or the like is preferably stored in association so that a correspondence between command data stored on the memory and (each piece of position data included in) trajectory data can be identified. It should be noted that the label data acquisition unit 108 is used during learning by the learning unit 110 and does not need to be included as an essential component of the machine learning device 100 once the learning by the learning unit 110 has been completed.

The learning unit 110 learns label data L (axis angle command data L1 indicating axis angle command data for each axis of the robot 2) that corresponds to a state variable S (axis angle data S1 indicating an amount of change of the axis angle of each axis converted from trajectory data of the end of the arm of the robot 2) in accordance with any of learning algorithms collectively called machine learning. For example, the learning unit 110 can learn a correlation between axis angle data S1 included in a state variable S and axis angle command data L1 included in label data L. The learning unit 110 can repeatedly perform learning based on a data set including a state variable S and label data L.

In the simplest case, the learning unit 110 can be configured to learn a relation between one amount of change Da of the axis angle of each axis that is included in axis angle data S1 and one piece of command data Ca for the axis that is included in axis angle command data L1. Further, the learning unit 110 can be configured to learn a relation between a series of (a plurality of) amounts of change of the axis angle of each axis (for example, in FIG. 3, an amount of change of axis angle of each axis when moving from $P_0$ to $P_1$, an amount of change of axis angle of each axis when moving from $P_1$ to $P_2$, an amount of change of the axis angle of each axis when moving from $P_2$ to $P_3$, . . . ) that are included in axis angle data S1 and a series of (a plurality of) pieces of command data for each axis that are included in axis angle command data L1. In the latter case, the accuracy of axis angle command data as an inference result is improved because axis angle command data for each axis can be inferred by taking into account all relations with a series of amounts of change of axis angle of each axis that are input at the same time.

Figure 4:
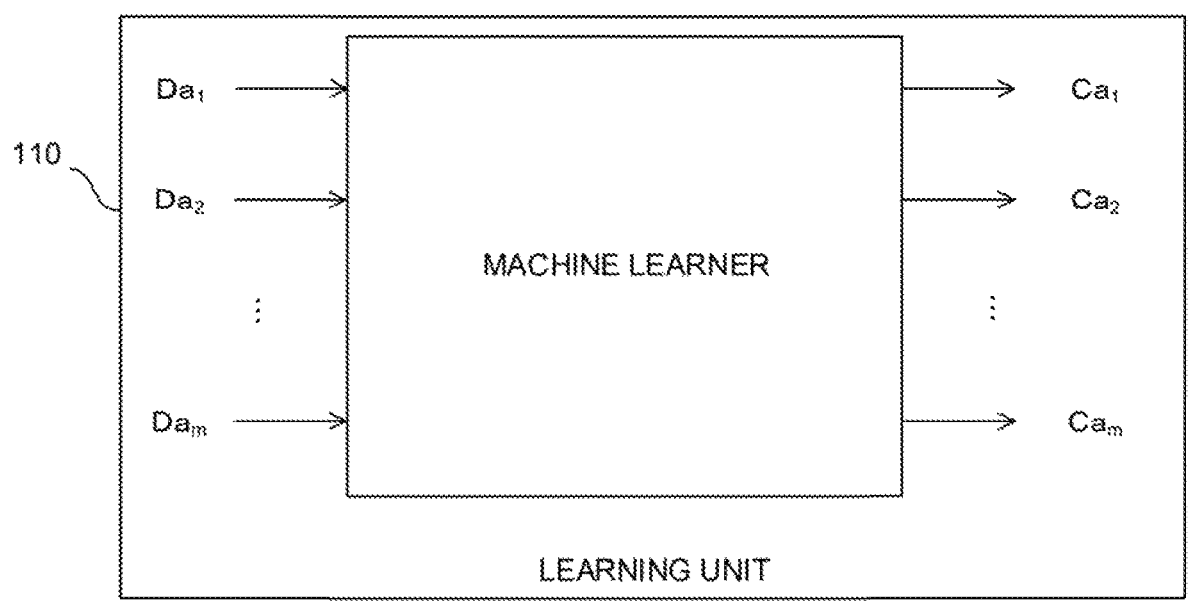
FIG. 4 shows a diagram illustrating an example of input data and output data in a learning unit.

FIG. 4 shows an example of input data and output data of a machine learner that constitutes the learning unit 110. A configuration in which m is equal to 1 in FIG. 4 is equivalent to the simplest configuration of the learning unit 110.

In learning by the learning unit 110, it is desirable that a plurality of learning cycles based on data acquired for each of a plurality of robots 2 are performed. By repeating such learning cycles, the learning unit 110 automatically interprets a correlation between an amount of change of the axis angle of each axis (axis angle data S1) converted from trajectory data of the end of the arm of each robot 2 and axis angle command data (axis angle command data L1) for each axis of the robot 2. While the correlation of axis angle command data L1 with the axis angle data S1 is practically unknown at the start of a learning algorithm, the learning unit 110 gradually interprets the relation between axis angle data S1 and axis angle command data L1 as the learning unit 110 keeps learning, and becomes able to interpret the correlation of the axis angle command data L1 with the axis angle data S1 by using a learned model obtained as a result.

It should be noted that while the learning unit 110 may be configured to include a single learning model, different learning models that are dependent on inertias that can be obtained from, for example, a structure and positional attitude of the robot 2 (and the weight of an object attached to or gripped by the end of the arm of the robot 2) may be provided. In this case, a plurality of intervals based on values of inertias may be created, different learning models may be built for the different intervals, a learning model that corresponds to an inertia calculated based on a structure or positional attitude of the robot 2 (and the weight of an object attached to or gripped by the end of the arm of the robot 2) may be selected, and learning and inference may be performed using the learning model. In this way, learning models each of which reflects a difference in motion of the robot due to a difference in inertia can be individually built and therefore costs of building learned models (the time and the like taken for a learning model to converge) and the sizes of the learned models can be reduced.

Based on a result of learning (a learned model) by the learning unit 110, the inference result output unit 122 infers axis angle command data for each axis of the robot 2 on the basis of (an amount of change of the axis angle of each axis converted from) trajectory data of the end of the arm of the robot 2 and outputs the inferred angle axis command data for each axis of the robot 2. More specifically, axis angle command data L1 relating to axis angle command data for each axis of the robot 2 learned by the learning unit 110 in association with axis angle data S1 indicating an amount of change of the axis angle of each axis converted from trajectory data of the end of the arm of the robot 2 indicates command data to be output by the control unit 34 to each axis of the robot 2 and the value is output in inference that uses a learned model by the learning unit 110. Based on the output value, the inference result output unit 122 then infers a command to be output to each axis of the robot 2 in order to achieve a trajectory (target trajectory) to be followed by the end of the robot 2 and outputs the result of the inference to the control unit 34.

The inference result output unit 122 is used by the machine learning device 100 in inference of axis angle command data to be output from the control unit 34 to the robot 2 for target trajectory data of the robot 2. More specifically, when target trajectory data to be followed by the end of the robot 2 is input into the machine learning device 100 from an external source such as the operating panel 71 or by a control program, the axis angle conversion unit 105 calculates an amount of change of the axis angle of each axis of the robot 2 on the basis of the input target trajectory data and the inference result output unit 122 infers axis angle command data L1 which is an amount of change of the axis angle to be issued to each axis of the robot 2 by using a result of learning by the learning unit 110 with the calculated amount of change of the axis angle of each axis of the robot 2 as axis angle data S1.

Figure 5:
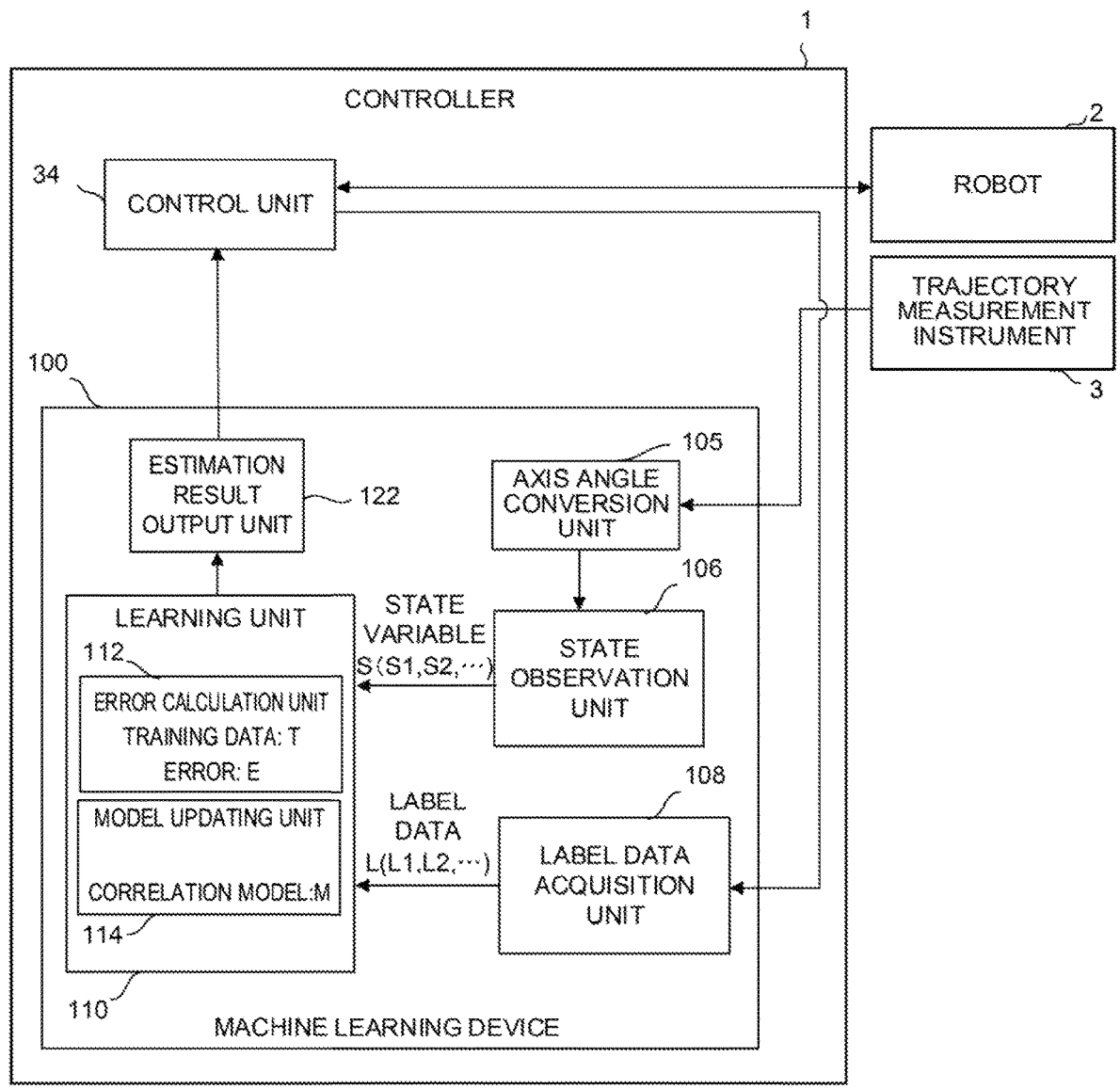
FIG. 5 shows a schematic functional block diagram illustrating one mode of a controller.

In the machine learning device 100 having the configuration described above, a learning algorithm to be executed by the learning unit 110 is not particularly limited and any known learning algorithms can be employed for machine learning. FIG. 5 illustrates another mode of the controller 1 shown in FIG. 2 and is a configuration including the learning unit 110 that performs supervised learning as another example of a learning algorithm. Supervised learning is a method in which a known dataset (called training data) including an input and an output corresponding to the input is provided and a feature that implies a correlation between the input and the output is identified from the training data, thereby learning a correlation model for inferring a required output corresponding to a new input.

In the machine learning device 100 provided in the controller 1 shown in FIG. 3, the learning unit 110 includes an error calculation unit 112 that calculates an error E between a correlation model M for inferring axis angle command data for each axis of the robot 2 on the basis of an amount of change of the axis angle of each axis converted from trajectory data of the end of the arm of the robot 2 and a correlative feature identified from training data T obtained from an amount of change of the axis angle of each axis converted from trajectory data of the end of the arm of the robot 2 that has been acquired in the past and a result of each piece of actual axis angle command data for the robot 2, and a model updating unit 114 that updates the correlation model M so as to reduce the error E. The learning unit 110 learns inference of each piece of axis angle command data for the robot 2 based on an amount of change of the axis angle of each axis converted from trajectory data of the end of the arm of the robot 2 by repeated updates of the correlation model M by the model updating unit 114.

An initial value of the correlation model M is, for example, a simplified representation (for example using a linear function) of a correlation between a state variable S and label data L and is provided to the learning unit 110 before start of supervised learning. As described above, data on an amount of change of the axis angle of each axis converted from trajectory data of the end of the arm of the robot 2 that has been acquired in the past and data on each piece of actual axis angle command data for the robot 2 can be used as the training data T in the present invention and is provided to the learning unit 110 as needed during operation of the controller 1. The error calculation unit 112 identifies a correlative feature that implies a correlation between an amount of change of the axis angle of each axis converted from trajectory data of the end of the arm of the robot 2 and each piece of axis angle command data for the robot 2 attached to the robot 2 with an identification code, using the training data T provided to the learning unit 110 as needed, and obtains an error E between the correlative feature and a correlation model M corresponding to a state variable S in the current state and label data L. The model updating unit 114 updates the correlation model M in the direction in which the error E is reduced in accordance with a predetermined update rule, for example.

In the next learning cycle, axis angle command data for each axis of the robot 2 is inferred using the state variable S in accordance with the updated correlation model M, the error calculation unit 112 obtains an error E between a result of the inference and label data L actually acquired, and the model updating unit 114 updates the correlation model M again. In this way, a correlation between the current state of the environment which has been unknown and an inference for the current state is gradually revealed.

When the supervised leaning described above is performed, a neural network can be used. While a neural network that includes three layers, namely an input layer, an intermediate layer, and an output layer, may be used as the neural network, a so-called deep learning technique, which uses a neural network composed of more than three layers can also be used to provide a configuration that allows more effective learning and inference.

Further, a recurrent neural network may be used in which data that are input in a time sequence are learned and inferred by taking into consideration past inputs. When the recurrent neural network is used, a machine learner that constitutes a learning unit 110 is capable of learning and inference by taking into consideration a past series of movements of a robot 2 even if the machine learner is configured to lean a relation between one change amount Da of the axis angle of each axis included in axis angle data S1 and one piece of command data Ca for the axis included in axis angle command data L1.

The configuration of the machine learning device 100 described above can be described by a machine learning method (or software) that is executed by the processor 101 step by step. The machine learning method is a machine learning method in which an amount of change of the axis angle of each axis converted from trajectory data of an end of an arm of a robot 2 is used to learn inference of axis angle command data for the robot 2, and includes the steps of observing, by a processor 101, an amount of change of the axis angle (axis angle data S1) of each axis converted from trajectory data of the end of the arm of the robot 2 as a state variable S representing a current state, acquiring axis angle command data (axis angle command data L1) for each axis of the robot 2 as label data L, and learning the axis angle data S1 and the axis angle command data for each axis of the robot 2 in association with each other using the state variable S and the label data L.

A learned model acquired by learning by the learning unit 110 of the machine learning device 100 can be used as a program module that is a part of software relating to machine learning. A learned model of the present invention can be used on a computer including a processor, such as a CPU or a GPU, and a memory. More specifically, the processor of the computer operates in accordance with an command from the learned model stored in the memory to perform calculation by taking as an input an amount of change of the axis angle of each axis converted from trajectory data of an end of an arm of the robot 2 and to output an inference result of axis angle command data for each axis of the robot 2 on the basis of the result of the calculation. The learned model of the present invention can be copied to another computer via an external storage medium, a network or the like and used on the computer.

When a learned model of the present invention is copied to another computer and used in a new environment, the learned model may be further taught based on a new state variable and label data acquired from the environment. In this case, a learned model derived from the learned model (hereinafter referred to as a derived model) based on the environment can be obtained. The derived model of the present invention is identical to the original learned model in that an inference result of axis angle command data for each axis of a robot 2 is output based on an amount of change of the axis angle of each axis converted from trajectory data of an end of an arm of the robot 2, but differs from the original learned model in that the output result is more adapted to the new environment than that of the original learned model. The derived model can also be copied to another computer via an external storage medium, a network or the like and used on the computer.

Further, a learned model that can be obtained by using an output obtained for an input into a machine learning device incorporating a learned model of the present invention to perform learning in another machine learning device from the very beginning (hereinafter referred to as a distilled model) may be built and the distilled model may be used (such a learning process is called distillation). In the distillation, the original learned model is also called a teacher model and the newly built, distilled model is also called a student model. In general, a distilled model is smaller in size than its original learned model and yet can achieve a degree of accuracy equivalent to that of the original learned model and therefore is more suitable for distribution to other computers via an external storage medium, a network or the like.

Figure 6:
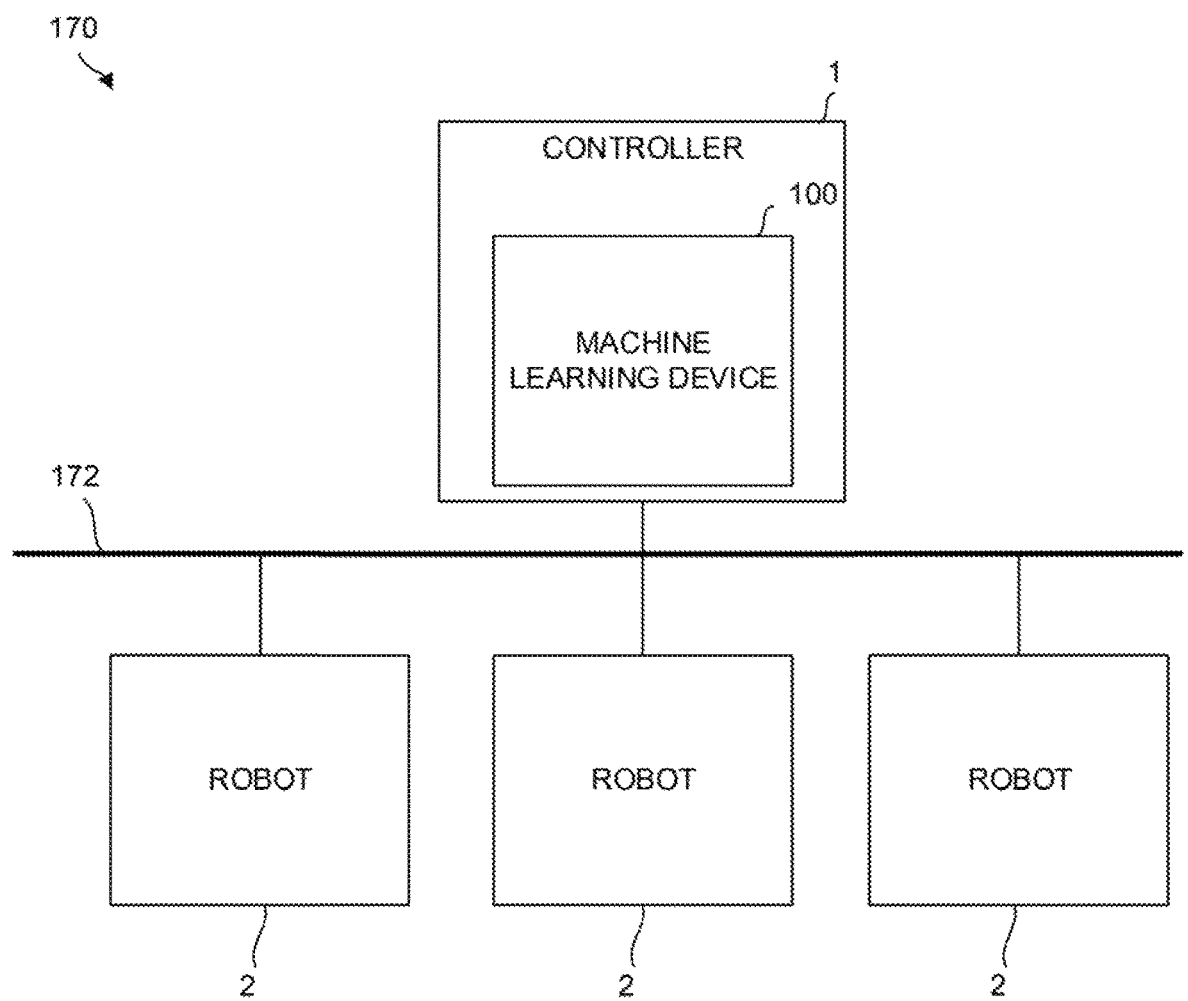
FIG. 6 shows a schematic functional block diagram illustrating one mode of a system incorporating a controller.

FIG. 6 shows a system 170 including a controller 1 according to an embodiment. The system 170 includes at least one controller 1 implemented as a part of a computer such as a cell computer, a host computer, or a cloud server, a plurality of robots 2 (manufacturing machines equipped with robots 2), and a wired/wireless network 172 that interconnects the controller 1 and the robots 2.

In the system 170 having the configuration described above, the controller 1 including a machine learning device 100 is capable of automatically and accurately inferring axis angle command data for each axis of each robot 2 that corresponds to trajectory data of an end of an arm of the robot 2 by using a result of learning by a learning unit 110. Further, the machine learning device 100 of the controller 1 can be configured to learn inference of axis angle command data for each axis of a robot 2 that is common to all of the robots 2 on the basis of a state variable S and a label data L acquired for each of the plurality of robots 2 and to allow a result of the learning to be used in all of the robots 2. The system 170 therefore can improve the speed and reliability of learning of inference of axis angle command data for each axis of robots 2 by taking as inputs a wider variety of data sets (including state variables S and label data L).

While embodiments of the present invention have been described above, the present invention is not limited to the embodiments described above and can be implemented in various modes by making modifications as appropriate.

For example, algorithms such as a learning algorithm and an arithmetic algorism executed by the machine learning device 100 and an algorithm executed by the controller 1 are not limited to those described above and various algorisms can be employed.

Further, while the controller 1 and the machine learning device 100 have been described as being devices that have different CPUs in the above embodiments, the machine learning device 100 may be implemented by a CPU 11 of the controller 1 and a system program stored in a ROM 12.

While embodiments of the present invention have been described, the present invention is not limited to the example embodiments described above and can be implemented in other modes by making modifications as appropriate.

The invention claimed is:

1. A controller that infers command data to be issued to an axis of a robot on the basis of trajectory data including positions of an end position of an arm of the robot, the controller, comprising:
   a processor configured to:
      receive the trajectory data from a trajectory measurement instrument that directly measures the positions of the end position of an arm of the robot along the trajectory;
      calculate, from the trajectory data, an actual amount of change of an axis angle of the axis of the robot when the end position of the arm of the robot moves between the positions in the trajectory data;
      determine axis angle data relating to the actual amount of change of the axis angle of the axis of the robot as a state variable representing a current state of an environment;
      acquire the command data indicating a commanded amount of change in the axis angle executed when moving the end position of the arm of the robot between the positions in the trajectory data for the axis of the robot as label data;
      learn an amount of change of the axis angle of the axis of the robot associated with executing the command data based on a correlation between the commanded amount of change to the actual amount of change; and
      modify the commanded amount of change in the axis angle in future command data based on the learned amount of change to control the end position of an arm of the robot to achieve a target trajectory to be followed by the end of the robot.

2. The controller according to claim 1,
   wherein the processor is further configured to:
   calculate an error between a correlation model for inferring command data for the axis of the robot from the state variable and a correlative feature identified from training data provided in advance; and
   update the correlation model so as to reduce the error.

3. The controller according to claim 1, wherein the processor is further configured to calculate the state variable and the label data using a multi-layer structure.

4. The controller according to claim 1, wherein the processor is further configured to use a learning model that can be learned based on time-series data.

5. A controller that infers command data to be issued to an axis of a robot on the basis of trajectory data including positions of an end position of an arm of the robot, the controller, comprising:
   a processor configured to:
      receive the trajectory data from a trajectory measurement instrument that directly measures the positions of the end position of an arm of the robot along the trajectory;
      calculate, from the trajectory data, an actual amount of change of an axis angle of the axis of the robot when the end position of the arm of the robot moves between the positions in the trajectory data;
      determine axis angle data relating to the actual amount of change of the axis angle of the axis of the robot as a state variable representing a current state of an environment;
      acquire the command data indicating a commanded amount of change in the axis angle executed when moving the end position of the arm of the robot between the positions in the trajectory data for the axis of the robot as label data;
      learn an amount of change of the axis angle of the axis of the robot associated with executing the command data based on a correlation between the commanded amount of change to the actual amount of change;
      infer and output command data for the axis of the robot on the basis of the state variable observed and a result of the learning; and
      modify the commanded amount of change in the axis angle in future command data based on the learned amount of change to control the end position of an arm of the robot to achieve a target trajectory to be followed by the end of the robot.

6. The controller according to claim 1, wherein the processor is further configured to select and use a learning model that corresponds to an inertia calculated on the basis of a structure of the robot from among a plurality of learning models each of which is associated with an interval of inertias.

7. The controller according to claim 1, wherein the machine learning device exists on a cloud server.

8. A machine learning device that learns command data to be issued to an axis of a robot, the command data corresponding to trajectory data including positions of an end position of an arm of the robot, the machine learning device comprising:
   a processor configured to:
      receive the trajectory data from a trajectory measurement instrument that directly measures the positions of the end position of an arm of the robot along the trajectory;
      calculate, from the trajectory data, an actual amount of change of an axis angle of the axis of the robot when the end position of the arm of the robot moves between the positions in the trajectory data;
      determine axis angle data relating to the actual amount of change of the axis angle of the axis of the robot as a state variable representing a current state of an environment;
      acquire the command data indicating a commanded amount of change in the axis angle executed when moving the end position of the arm of the robot between the positions in the trajectory data for the axis of the robot as label data; and
      learn an amount of change of the axis angle of the axis of the robot associated with executing the command data based on a correlation between the commanded amount of change to the actual amount of change.

9. A machine learning device that has learned inference of command data to be issued to an axis of a robot, the command data corresponding to trajectory data including positions of an end position of an arm of the robot, the machine learning device comprising:
   a processor configured to:

receive the trajectory data from a trajectory measurement instrument that directly measures the positions of the end position of an arm of the robot along the trajectory;

calculate, from the trajectory data, an actual amount of change of the axis angle of the axis of the robot when the end position of the arm of the robot moves between the positions in the trajectory data;

determine axis angle data relating to the actual amount of change of the axis angle of the axis of the robot as a state variable representing a current state of an environment;

acquire the command data indicating a commanded amount of change in the axis angle executed when moving the end position of the arm of the robot between the positions in the trajectory data for the axis of the robot as label data;

learn an amount of change of the axis angle of the axis of the robot associated with executing command data based on a correlation between the commanded amount of change to the actual amount of change; and infer and output command data for the axis of the robot on the basis of the state variable observed and a result of the learning.

* * * * *